Aug. 28, 1928.
A. E. SCHEIN
1,682,189
BABBITTED BEARING
Filed Feb. 20, 1922    2 Sheets-Sheet 1
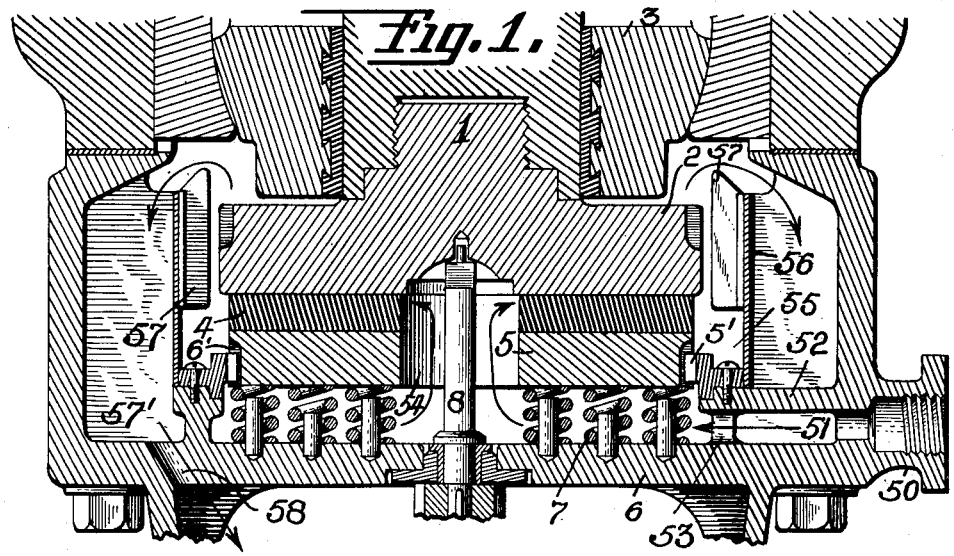
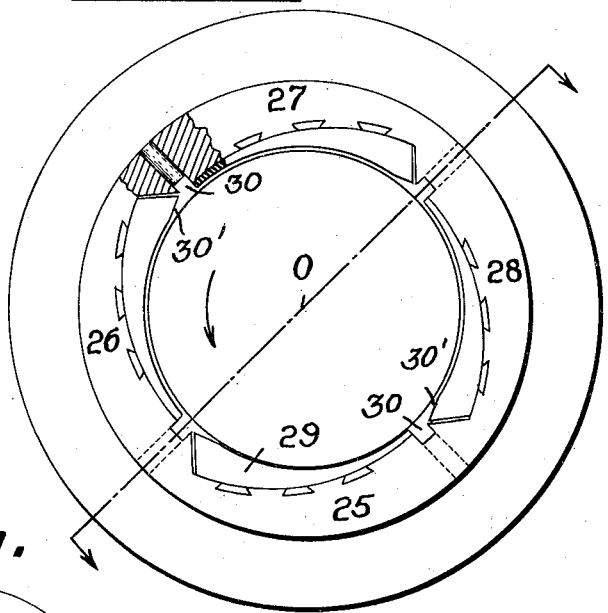
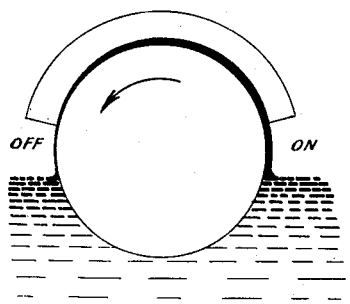
Inventor
ALEXANDER E. SCHEIN.
By his Attorney
Herbert H. Thompson

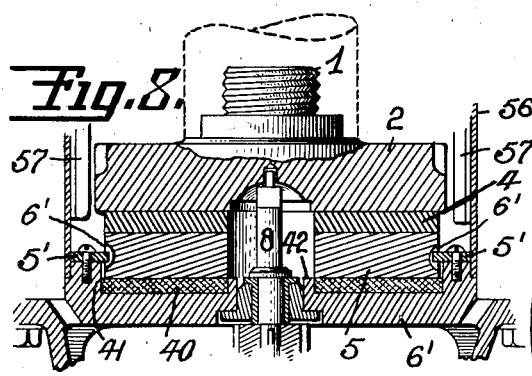
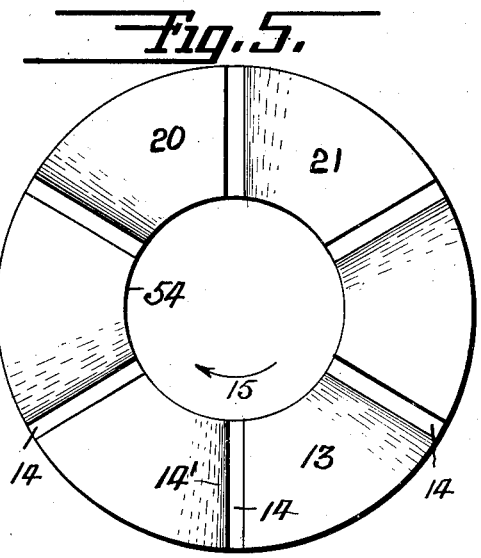
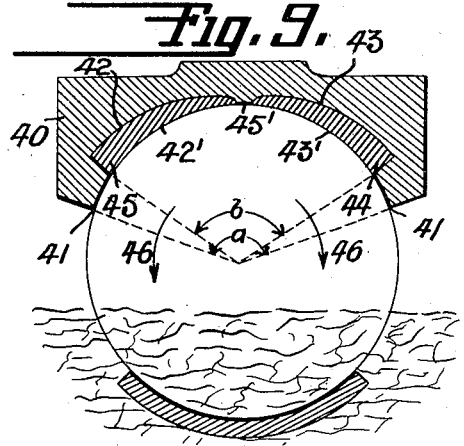
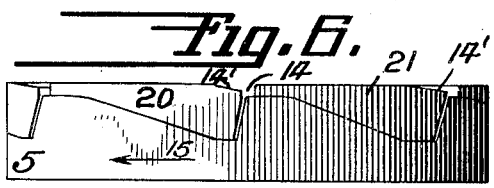
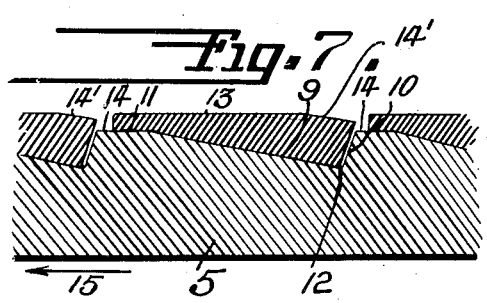
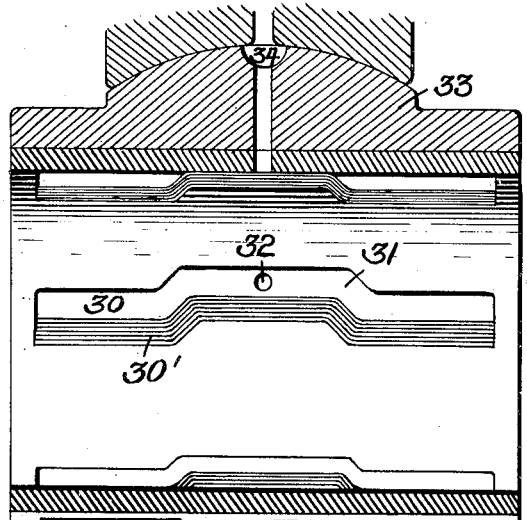
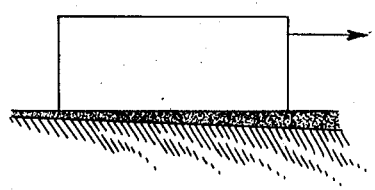

Patented Aug. 28, 1928.

1,682,189

UNITED STATES PATENT OFFICE.

ALEXANDER E. SCHEIN, OF NEW YORK, N. Y., ASSIGNOR TO THE SPERRY GYROSCOPE COMPANY, OF BROOKLYN, NEW YORK, A CORPORATION OF NEW YORK.

BABBITTED BEARING.

Application filed February 20, 1922. Serial No. 537,709.

This invention relates to so called plain bearings as distinguished from roller and ball bearings and has application both to thrust and radial bearings. It has been worked out and is now well understood that in order to obtain the best results in bearing lubrication an oil film of appreciable thickness, as distinguished from wetted surfaces must be built up and maintained between the shaft and bearing by the movement of the shaft. In ordinary bearings in which the load is in the same direction at all times, this is accomplished more or less automatically by giving the bearing a slight clearance. The shaft in rotating tends to be displaced in the direction of rotation as shown in Fig. 3 and thereby provides a slightly thicker oil film on the "on" side of the bearing than on the "off" side. This builds up and maintains an oil film which completely separates the shaft from the bearing. In the ordinary thrust bearing, no such action takes place and the oil is found to be rubbed out between the flat surfaces, so that no oil film will be maintained. One cause of this difficulty is, of course, the fact that the oil on entering the bearing is much cooler and more viscous than it is after passing along the bearing so that sufficient oil to lubricate the points of the bearing remote from the point where the oil enters is not obtained. One method of overcoming this is to make a slight angle between the two bearing surfaces (see Fig. 4), so that the oil film is thicker on the "on" side than on the "off" side of the bearing. I am aware that it has been proposed to accomplish this result by means of a series of pivoted blocks. I find however this complication is entirely unnecessary and that desirable results may be secured by a plain bearing when constructed according to my invention.

Referring to the drawings in which what I now consider to be the preferred forms of my invention are shown;

Fig. 1 is a vertical section view of a thrust bearing for a vertical shaft, designed according to my invention.

Fig. 2 is an end view of a radial bearing, partly in section constructed according to my invention.

Fig. 3 is a diagrammatic view showing the theory of lubrication of a plain radial bearing.

Fig. 4 is a diagrammatic view illustrating the theory of correct lubrication for a thrust bearing.

Fig. 5 is a plan view of the bearing surface of Fig. 1.

Fig. 6 is a side elevation of said bearing surface.

Fig. 7 is a sectional development of a modified form of said surface.

Fig. 8 is a sectional elevation of a modified form of thrust bearing.

Fig. 9 is a sectional view of my invention as applied to a railway journal bearing.

Fig. 10 is a longitudinal sectional view of a radial bearing shown in Fig. 2, line 10—10.

In order to carry out my invention, I propose to employ as a lining for the bearing, a special babbitt or other substance which elastically deforms easily, or in other words which has a low modulus of elasticity. The relation between these factors is shown by the equation, $$D = \frac{P \times T}{C}$$

Where D=deformation,
P=load per unit area,
T=thickness of the metal,
C=modulus of elasticity.

Therefore, in selecting a Babbitt or other metal for my improved bearing, I propose to employ a substance having a low modulus of elasticity as the first requirement, rather than a low co-efficient of friction and also of course requisite softness to prevent damage to the shaft in case of the bearing running dry. Next, I propose to cause the babbitt to yield unequally throughout its length, the greatest yielding occurring where the oil wedge enters the bearing. With such material I so proportion the thickness of the bearing employed at each point that a thicker oil film will be built up and maintained on the "on" side of the "off" side of the bearing, and without the employment of any pivoted blocks.

In Fig. 1, the vertical shaft is designed to be screwed in place on top of the threaded stud 1 on the revolvable bearing block or collar 2, the radial bearing block being shown at 3. Said collar rests directly upon the babbitted surface 4 which is supported on the steel block 5. The steel or other metal of block 5 should be so chosen as to have substantially the same heat coefficient of expansion as the babbitt of part 4. Said block in turn is resiliently supported in the base 6, as by means of springs 7, and is prevented from turning by detachable lugs 5' secured to base 6 and engaging notches 6' in said block. The small shaft 8 serves to drive the oil pump (not shown). The design of the said babbitted bearing may be best understood by reference to Figs. 5, 6 and 7. As shown, the base 5 is provided with a plurality of inclined surfaces 9, six being provided in the bearing illustrated. Each surface terminates in a substantially vertical surface 10, so that the whole has a slight resemblance to large saw teeth. Said surface 9 may be more or less horizontal near each end, as at 11 and 12. On said block I place my special babbitt having as stated a low modulus of elasticity. As an example of what may be obtained in this direction, the following table will be found interesting:

For steel, C=30,000,000,
For ordinary babbitt, C=1,500,000 to 2,000,000,
For special babbitt C=800,000 to 1,200,000.

In other words, with the special babbitt, a modulus of elastcity may be obtained which is nearly one-half that of an ordinary babbitt and which is about 3% that of steel. This babbitt is placed on said block 5 so as to form an upper surface 13, which under no load may be substantially parallel to the under surface of the collar 2. Preferably however, I provide radial oil grooves 14 leading through said bearing, through which oil is circulated in any known manner. Also, I prefer to slightly bevel off the babbitt on the off side from said grooves as shown at 14'. The bearing illustrated is designed for a shaft rotating in the direction of arrow 15 in Figs. 5, 6 and 7.

It will be observed that by my design I secure a much greater thickness of babbitt at points on the "on" side of the bearing than on the "off" side. When the shaft is rotating, therefore, due to the bevel surfaces 14', an oil film will be built up between the babbitt and the rotating collar. The babbitt however being much thicker at this point than further back will compress to a greater degree according to the equation, $$D = \frac{P \times T}{C}$$

and hence will not scrape off the oil at this point but will permit it to get between the bearing and the shaft, thereby building up a continuous oil film as shown in Fig. 4. The babbitted sections 20, 21 etc. may be continuous, but are preferably separated as shown in Figs. 6 and 7.

For lubricating the bearing, the oil may be introduced through the coupling 50 flowing into the space 51 beneath the plate 52 and underneath the block 5, through opening 53. The oil there ascends through the central opening 54 in the plate 5 and flows outwardly through channels 14 in babbitt 24 into the annular space 55 which is surrounded by the large ring 56. In the inner surface of said ring, baffle plate 57 may be provided to prevent undue churning of the oil. The oil then overflows from said plate out into the annular space 57' surrounding the same and out through the opening 58, the direction of flow of the oil being indicated throughout by the arrows. It will be understood that the oil pump (not shown) driven from shaft 8 continuously circulates the oil and may place the oil under sufficient pressure to force the oil between the bearing surfaces when the bearing is at rest, thus preventing wiping of the bearing before the oil film due to the action above described builds up.

In Fig. 8, a modified form of support for the metal block 5 is shown. Instead of employing springs, I place between the block 5 and the base 6' a layer or disk 40 of some pliable but elastic material, such as cork or felt. Such material I find retains its elasticity indefinitely and will support extremely heavy loads when confined. I therefore confine said disk between the upturned periphery 41 of the base 6' and an inner annular raised portion 42, so that the felt or cork cannot spread laterally. By this means, I avoid the use of springs.

My invention also has application to radial bearings, especially to those bearings which are not always driven in the same direction, or in which the load is not constant, or both. In these cases the bearing does not wear so as to build up the proper oil films as well as where the load and direction are constant. One application of the invention is illustrated in Figs. 2 and 10, this application being especially designed for radial bearings of gyroscopic rotors used for stabilizing ships. In such apparatus, while the direction of rotation is constant, the direction of the load continuously varies from one quarter to another, the main stresses being exerted laterally in each direction and vertically in each direction. To meet this condition, I first design the bearing as a whole in accordance with my prior invention on radial bearings, for which I secured Letters Patent of the United States No. 1,662,903 on March 20, 1928.

According to said prior invention, the bearing is laid out in four quadrants 25, 26, 27 and 28, the center of curvature of each quadrant being slightly to one side of the center O of the bearing as a whole, so that a uniform bearing surface of wide arc may be secured for the shaft, no matter in what direction the load is placed.

In this invention however, I go further than in my prior invention and line each bearing block or quadrant with babbitt 29 of low modulus elasticity and of varying thickness, the thickness being greater in each quadrant on the "on" side. As in the other form of my invention, I prefer to provide oil grooves 30 through the bearing, which in this instance are substantially parallel to the axis of the bearing. Preferably however, the grooves are not straight, but are offset as at 31 for a portion of their length, so that the support of the shaft may not be wholly removed on any axial line. The oil may be introduced into said grooves through apertures 32, leading in through the bearing block 33 from circumferential groove 34 therein, as is well understood in this art. As before, bevelled portions 30' lead away from said grooves.

In Fig. 9 I have illustrated the application of my invention to a railway bearing designed for operation in either direction and also designed to take care of the lateral thrust caused by the brake shoes. According to this invention, I prefer to make the supporting brass 40 of somewhat greater length than the present practice, so as to cover a greater arc $a$ of the shaft. At each end however, said brass is made with a slight clearance 41, so that under the normal load on the car, it does not touch the shaft, but will be brought into action in resisting the lateral thrust of the brake shoes. The interior of said brass is cut out on inclined surfaces 42, 43, the groove thus made being filled with my special babbitt, so that the surface resting on the shaft is entirely babbitted, the angle $b$ subtended by the Babbitt surface being made substantially the same as the angle subtended by the ordinary car brasses. As noted, the babbitt is thickest on each end 44, 45 and tapers off toward the vertical center line. Preferably at the center, no babbitt is placed, the brass coming down to within a short distance of the car axle, as at 45'. The operation of this babbitt in building up proper oil film is exactly the same as that described in the previous invention, the babbitted portion 42' operating to increase the thickness of the oil on the "on" side of the bearing when the car axle is rotating in the direction of the arrow 46, while the babbitt 43' operates when the car axle is rotating in the opposite direction.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention what I claim and desire to secure by Letters Patent is:

1. A thrust bearing comprising a supporting base and a babbitted bearing surface of low modulus of elasticity thereon having a plurality of oil grooves therethrough, the thickness of the babbitt of said surface being greater by a predetermined amount, where the oil enters between the same and its shaft to provide by the compression of the babbitt a sufficient space for the entering oil film to maintain the film across said surface.

2. A bearing comprising a supporting base and a babbitted bearing surface thereon having a plurality of oil grooves therethrough, the thickness of the babbitt of said surface being greater by a predetermined amount where the oil enters between the same and its shaft and the elasticity of the babbitt being such as to provide by the compression of the babbitt a sufficient space for the entering oil film to maintain the film across said surface.

3. A thrust bearing comprising a supporting base a resilient support for said base, a plurality of sections on said base subject to the wedging action of the lubricant, each section being composed of a metal having a much less modulus of elasticity than the base, said metal being thicker where the oil enters the bearing.

4. A thrust bearing comprising a base having a plurality of inclined surfaces, a Babbitt block or blocks resting on said surfaces and presenting a substantially flat surface having radial depressions therein, said blocks being bevelled off slightly adjacent said depressions and being composed of babbitt having a low modulus of elasticity.

5. A thrust bearing comprising a stationary member, a plurality of circumferentially grouped stationary bearing shoes directly supported on said member and adapted to support a rotatable member, said shoes being of a more easily compressible metal than the metal of said member, and each of said shoes being of graduated thickness so as to yield unequally under compression to present inclined surfaces.

6. A thrust bearing comprising a base having a saw tooth or uneven surface, a babbitted lining on said base presenting a substantially flat surface having oil grooves therein, said babbitt having a low modulus of elasticity and being of sufficient thickness at the points of depression in the base to yield to the pressure of the entering oil wedge.

7. A thrust bearing comprising a stationary member, a plurality of circumferentially grouped stationary bearing blocks of thick babbitt of low modulus of elasticity on said member for supporting a rotatable member, each of said blocks being adapted to be compressed unequally throughout its length by the oil film entering each block to present inclined surfaces to the rotatable member in operation, means for supplying oil to said bearing between said blocks, said blocks having their maximum yielding where the oil enters the bearing.

In testimony whereof I have affixed my signature.

ALEXANDER E. SCHEIN.